(12) United States Patent
Drozdov et al.

(10) Patent No.: US 12,141,343 B2
(45) Date of Patent: Nov. 12, 2024

(54) PERSONALIZED CALIBRATION-INDEPENDENT REGIONAL FIXATION PREDICTION FOR SIMULTANEOUS USERS OF A DIGITAL DISPLAY

(71) Applicant: BLINK TECHNOLOGIES INC., Palo Alto, CA (US)

(72) Inventors: Gilad Drozdov, Haifa (IL); Oren Haimovitch-Yogev, Haifa (IL); Tal Knafo, Haifa (IL)

(73) Assignee: BLONK O.G. LTD., Haifa (IL)

(*) Notice: Subject to any disclaimer, the term of this patent is extended or adjusted under 35 U.S.C. 154(b) by 511 days.

(21) Appl. No.: 17/551,187

(22) Filed: Dec. 15, 2021

(65) Prior Publication Data
US 2022/0206571 A1    Jun. 30, 2022

Related U.S. Application Data

(60) Provisional application No. 63/131,365, filed on Dec. 29, 2020.

(51) Int. Cl.
*G06F 3/01* (2006.01)
*G06T 7/11* (2017.01)
*G06V 40/16* (2022.01)

(52) U.S. Cl.
CPC ............... *G06F 3/013* (2013.01); *G06T 7/11* (2017.01); *G06V 40/161* (2022.01); *G06T 2207/30041* (2013.01); *G06T 2207/30201* (2013.01)

(58) Field of Classification Search
CPC ........................................................ G06F 3/013
USPC ........................................................ 382/104
See application file for complete search history.

(56) References Cited

U.S. PATENT DOCUMENTS

| 11,556,741 | B2* | 1/2023 | Dierkes | G06V 10/772 |
| 2014/0049452 | A1* | 2/2014 | Maltz | G02B 27/017 345/8 |
| 2014/0145935 | A1* | 5/2014 | Sztuk | G06V 40/19 345/156 |
| 2015/0309569 | A1* | 10/2015 | Kohlhoff | G06V 40/193 382/103 |
| 2016/0093136 | A1* | 3/2016 | Lyons | G07F 17/3237 463/31 |

* cited by examiner

*Primary Examiner* — Gabriel I Garcia
(74) *Attorney, Agent, or Firm* — AlphaPatent Associates Ltd.; Daniel J. Swirsky

(57) ABSTRACT

The disclosure relates to systems, methods and programs implicitly determines the individual gaze correction required for each user when it comes to determining the point-of-regard and region of interest using a seamless-adaptation-process (SAP) in settings when calibration is not practical/desired (e.g. long-range display eye sensing). The present systems, methods, and programs also correct for variables arising from salient features such as user eye attributes (e.g., ocular dominance or chronic eyesight conditions) that are not visible within a digital frame, environmental conditions, and camera-screen settings. The method is not eye-tracking method dependent, can perform under all environmental conditions while the displayed content is known. The concept of a data driven seamless gaze correction can be extended beyond long-range displays to any gaze-enabled device where fixation accuracy can be improved (e.g., mobile phones, tablets etc.).

14 Claims, 5 Drawing Sheets

PERSONALIZED CALIBRATION-INDEPENDENT REGIONAL FIXATION PREDICTION FOR SIMULTANEOUS USERS OF A DIGITAL DISPLAY

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods, and programs for use in gaze estimation, eye tracking, for long-range passive optical eye-tracking. More specifically, the disclosure is directed to systems, methods, and programs for developing real-time user-specific screen adjustment that requires no training or prior knowledge of the environment, user ID, position in 3D space or eye-model by using only the screen topology layout and raw gaze predictions from an existing general purpose eye-tracking module.

Eye tracking and gaze estimation can be used in a large number of applications from ophthalmology, assistive technologies for the visually impaired, through advertising, cybersecurity authentication, to gaming and professional e-sports, aviation, and remote panel-control. Precisely detecting the pupil's contour and central point, glint localization and the eyeball-center location is the first step in many of the tasks associated with many of the commercial gaze-estimation systems, hence the need to perform the detection and information analysis with precision. Typically, video oculography (VOG) eye trackers provide information about a position of an eye within the image of the eye as captured and registered by a camera, which is divided into two stages: eye/pupil detection and gaze estimation based on the information extracted from the eye/pupil detection.

Likewise, gaze-estimation can be divided into two approaches: a 2D appearance/feature-based approach; and an eye-model-based approach—usually obtained by active illumination of the eye region. Appearance/feature-based methods are typically based on the assumption that similar eye appearances/features (e.g., eye corners, elliptical fitting of pupil/iris etc.), correspond to similar gaze positions/directions, from which different mapping functions can be learnt to perform gaze estimation, usually by means of regression or closed-form equations (in other words, by a mathematical expression with a finite number of standard operations). Conversely, 3D model-based methods perform gaze estimation based on a geometric 3D eye model, which mimics the structure and behavior of the human visual system as driven by the model's underpinning. Both methods require a step of user-specific calibration per each of the user's eyes, to provide minimal accuracy of no more than several degrees of error. External eye-tracking hardware devices also require a physical screen-to-camera-illumination-source calibration each time the setup is assembled. This process requires human involvement and technical expertise.

Physiologically the human eye structure is different in both appearance (eye color, eyelashes, size and shape of the pupil, iris and sclera region size and veins) and from its internal invisible structure (location of fovea and optometric conditions (e.g. prism diopter, astigmatism etc.)). Hence, different individuals may have different focus locations given similar (or even identical) visible features which together with other potential error-introducing factors, such as: camera resolution limitations, visibility, image quality, and model limitations may accumulate and have an impact on the accuracy of the person's point-of-regard (PoR).

To obtain the function mapping (or projecting) eye tracker output to a PoR, nearly every eye tracking determination starts with a so-called calibration procedure. When applicable (often on a personal eye-tracking device) the errors illustrated above concerning the PoR are corrected using an active calibration. This procedure is designed to correct the mapping from the output of eye tracker to a PoR a location where the user is looking to on the screen (or any other target surface, such as, for example, a digital advertising screen, an ATM graphic user interface, a digital menu, an elevator panel and the like). The process of calibration is difficult to perform, and requires user interaction looking at designated points across the screen.

The process of calibration is device-specific, may depend on the eye-tracking technology that is providing the PoR and needs to be adapted per user, environmental conditions, and the location of the eye-tracking device with regard to the digital display or camera position.

The optimization of calibration and possible means of simplifying this process have been studied extensively, in terms of number of calibration points, computational complexity, accuracy and generalization between the calibration points and free-view of the user after the calibration (e.g., if user has spectacles and takes them off/on, different head-pose positions etc.).

However, most if not all eye-tracking solutions (appearance/feature based and model-based) or their combination are still typically subject to a calibration process which is not practical in many applications such as digital-retail, where many individuals are looking at a large digital-display and an individual calibration process cannot be performed.

For this reason, many of the applications are still limited in their ability to use eye-tracking analysis. These and other shortcomings of the existing technologies are sought to be resolved herein.

SUMMARY

Disclosed, in various exemplary implementations, are systems, methods and programs, for ascertaining an individual's point-of-regard (PoR), given a scenario where a plurality of users are facing the same digital camera coupled to a digital display. Specifically, provided herein are systems, methods and programs, for ascertaining an individual user's point-of-regard (PoR), and performing an automated projection of the PoR of the user based on a learning process directed by physiological considerations of the human eye's functionality and the digital layout of the display without any limitation as to the number of users, the location of the digital camera in relation to the screen, or the eye-tracking technology (e.g. active sensing, model-based or appearance based).

In one embodiment provided herein is a computerized method for determining a user focused region of interest on a display screen, implemented in a system comprising a display screen having known dimensions, an imaging module coupled to the display screen; and a central processing module (CPM) in communication with the imaging module and the display screen, the CPM further comprising at least one processor in communication with a non-volatile memory storage device, storing thereon a set of executable instructions that when executed cause the at least one processor to perform the steps of: using the imaging module, capturing an image of a user facing the display screen; using the known dimensions of the screen and eye image data from the image of the user, determining the user's point of regard (PoR); and using the PoR, determining the user's region of interest (ROI) on the screen, wherein the user is one of a plurality of users.

In another embodiment provided herein is an article of manufacture for determining a focused region of interest (ROI) on a display screen for a user among a plurality of users, comprising a computer-readable media with set of executable instructions that when executed one at least one processor cause the at least one processor to: using an eye-tracking module in communication with the article of manufacture, capture a plurality of images of a user facing the display screen; using known dimensions of a display screen in communication with the article of manufacture, determine the user's point of regard (PoR); and map the PoR to a region of interest (ROI) on the display screen.

BRIEF DESCRIPTION OF THE FIGURES

The following figures are intended to provide a better understanding of systems, methods, and programs for developing real-time, automatic and seamless-adaptation-processes (SAP) in settings when calibration is not possible or practical, to enable an accurate estimation of point-of-regard (PoR) on 2D digital displays. For the purposes of this disclosure, it is assumed that an appearance-based eye-tracking mechanism is used. However, it can be replaced with the standard pupil-center corneal-reelection video-oculography method or any other eye-tracking method known by those of ordinary skill in the art. In the detailed description that follows, reference is made to the accompanying examples and figures, in which.

DETAILED DESCRIPTION

Provided herein are exemplary implementations of systems, methods, and programs for developing a seamless adaptation process (SAP) for gaze correction and its mapping to a PoR on a remote digital display or any other gaze-aware interface where explicit user-calibration is not practical.

The provided systems, methods and programs are adapted, when implemented, to provide an estimate of the user's region-of-interest (ROI) without applying any means of active user calibration process by adding an additional layer of seamless-adaptation-process (SAP). Therefore, the user does not have to recalibrate the system, or adjust camera position after the system is turned-on. It allows the user to drastically change his position with regard to the camera, or alter the environmental settings (e.g. illumination, eyewear, etc.) and provide ROI information in cases of, but not limited to, long-range-displays, where user-specific calibration is not practical.

The provided systems, methods and programs are adapted, when implemented, to provide mapping between a known display layout (e.g. M×N grid) and the user's eye fixations, provided by a general gaze-estimation procedure. The disclosure assumes an appearance-based gaze estimation method that is applied to an image of the face and eyes. Therefore, the gaze estimation system does not have to use heuristics to determine the ROI on the screen. The disclosed systems, methods, and programs (processor-readable media e.g.,) can be extremely beneficial for user experience in both mid-range (laptop, mobile-device) and long-range (TV display, billboard) for cases of both active (e.g., touchless panel control) and passive (e.g., statistical aggregation of crowd viewing patterns) gaze tracking. The continuous and automatic determination of the user's ROI is an advantage in systems that require gaze-based rendering, psychological experiments or eye-control for accessibility. Moreover, the disclosed and claimed technology is not only limited to mid-range or long-range settings but can also be altered to provide a solution when only the eyes of the user are captured from short-range. In any setting where a raw (and insufficiently accurate) gaze prediction is provided, the disclosed SAP process can be used to significantly improve the accuracy for practical use.

Figure 6:
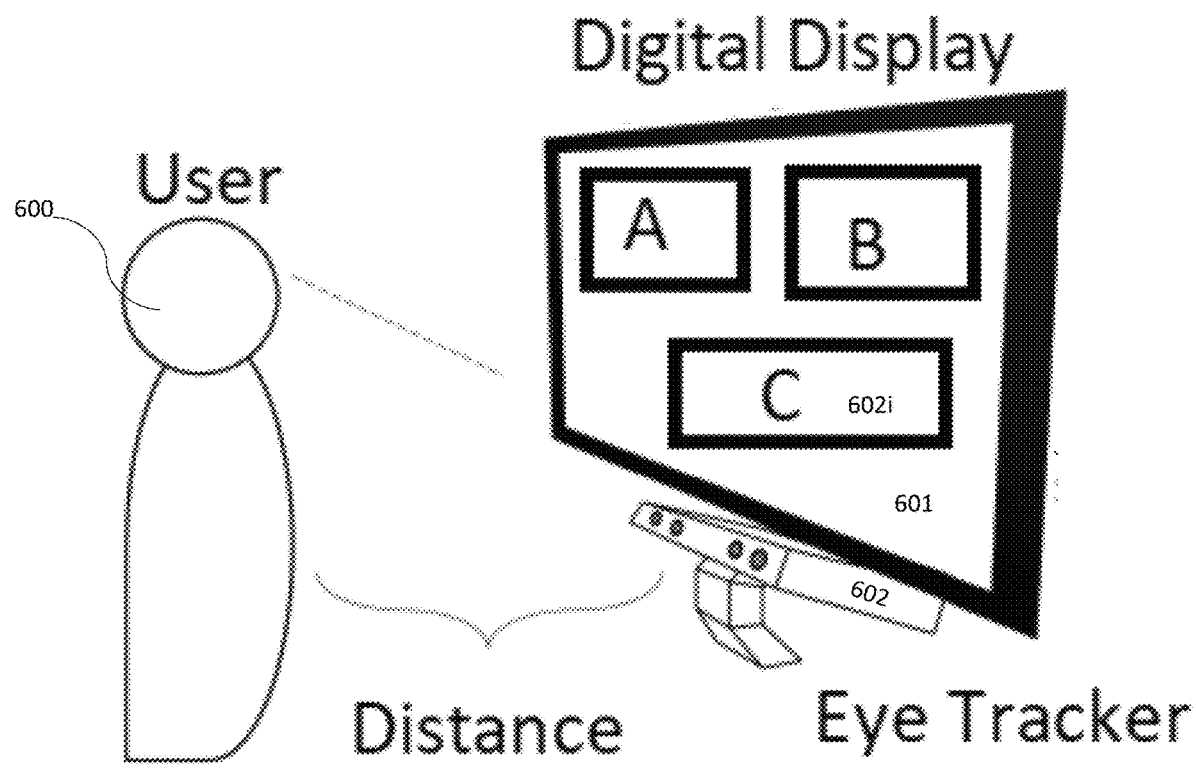
FIG. 6 shows a schematic illustration of a system setting.

In the context of the disclosure, the term "mid-range" refers to cases when the reference camera is situated between 30-150 cm from the user's eyes, while the term "long-range" refers to cases when the reference camera is situated between 200-400 cm from the user's eyes. In both cases there is usually a digital display that projects content which is consumed by the user and can be activated by the user in a touchless manner, using eye gestures (e.g. dwell-time). A schematic layout of the system is depicted in FIG. 6.

Gaze estimation methods can be categorized as either model/feature-based or appearance-based. Model/Feature-based methods extract eye features such as low-level human generated feature detectors e.g. eye contour, eye-corners, pupil radius, pupil center and corneal reflections (referred to as glint(s)). Most methods require active light sources outside of the human vision spectrum (e.g., Infrared (IR)), and can achieve relatively high accuracy. However, accurate and robust feature extraction requires specialized equipment such as infrared (IR) light source(s) to provide a strong contrast and high image quality to enable the extraction of these features. In most applications, an intrinsic camera calibration (and extrinsic in the case of a multi-camera system) and a personal user calibration process is mandatory. These methods are all setup dependent (e.g. camera type and its location with regard to screen) and highly affected by eye visibility, visual obstruction, low feature quality, and the idiosyncrasies of the originating user's physiological eye structure.

Although setup calibration can be a single-time process performed by technical personnel (e.g., camera-screen calibration). The required user calibration before interaction must be applied for every user, and for some use-cases for multiple users at once that are gazing toward a large digital display. This cannot be achieved using contemporary methods.

Accordingly, provided herein is a continuous, seamless, and versatile process that determines in real-time, for each user (when multiple users are present) using any camera or eye-tracking method, aPoR prediction, and a mapping of the user's region-of-interest (ROI). It does not require any special devices, nor active user interaction. Given the screen layout, the SAP is trained in an unsupervised manner (no ground-truth labels are required during the process), to select the optimal regional boundary on the screen that maps the head-eye combination generating the raw gaze-prediction that optimizes the accuracy and precision of PoR mapping on the digital display. This includes the implicit consideration of limited features detection caused by variable image quality and resolution, variance of lighting conditions, head pose, and user variability in terms of internal eye structure (e.g., eye dominance or vision impairments).

Given an unlabeled set of raw gaze predictions, the systems, methods and programs provided herein perform a weighted selection of refined screen grid boundaries that best represent the user's PoR on the screen based on the head-eye information and the provided original screen layout (as depicted in FIG. 6). The results of the SAP process is an adjusted boundary layout, which best represents the fixation patterns of the specific user, and replaces the active calibration process. The adjusted boundary layout is then mapped into a full PoR prediction for every frame captured by the digital camera/eye-tracking device. This allows, among other applications, applying model-based algorithms or appearance based eye tracking for accurate remote gaze prediction without requiring an additional calibration stage.

The unsupervised approach is built upon the constraints of minimization of gaze error with regard to the original layout, assuming the user was viewing the content. This is implemented through a loss-function, which is optimized through the training processes done online, without any ground-truth labeling. Furthermore, the system can be trained based solely on the provided raw-gaze data without exhaustive human labeling. The systems, methods, and programs provided herein allow for the user's ROI to be found in an unsupervised manner, thus relaxing a demand for exhaustively large, consistently and thoroughly labeled datasets, which can be quite expensive and at times impossible to validate (without explicit information about the user's eye aberrations or conditions, e.g., myopia, presbyopia).

Figure 4:
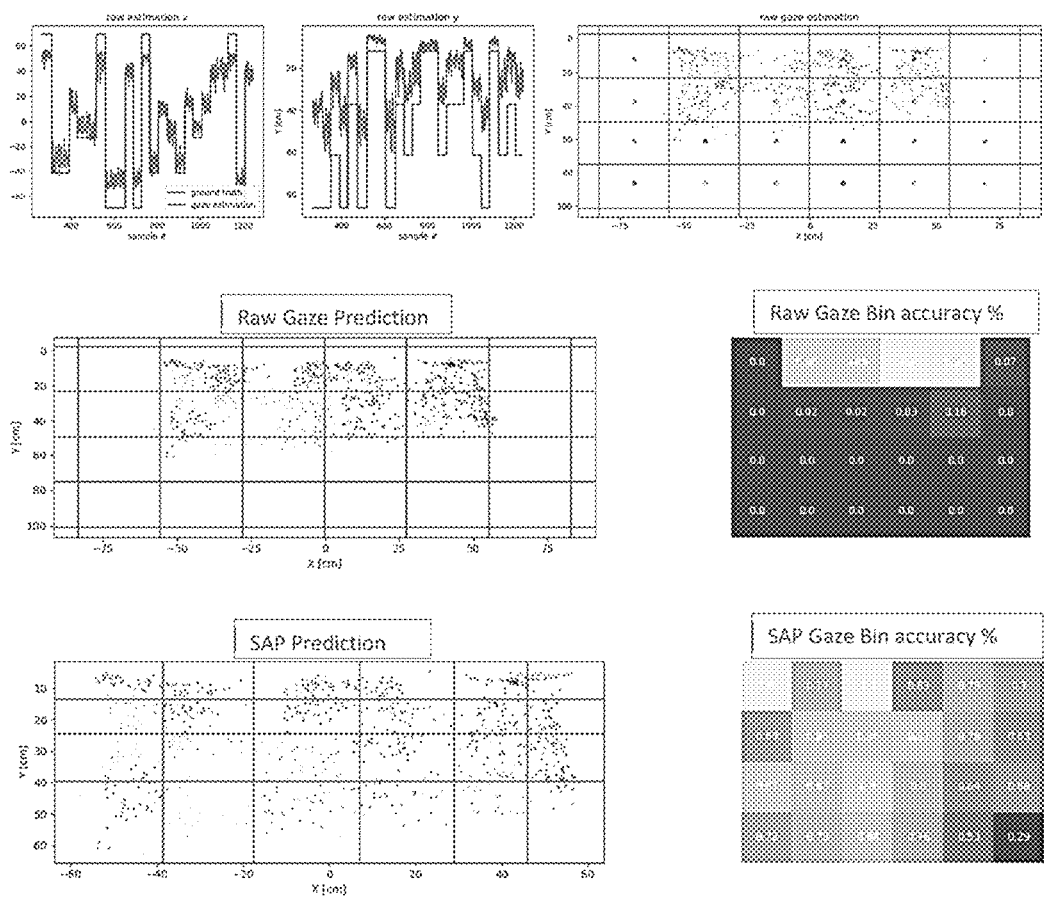
FIG. 4, shows Raw Gaze estimation cross-section and seamless-adaptation-process (SAP) correction.

A sample pseudo code for the data acquisition process is provided below:

1. Set up digital display with calibrated camera with known location (in 6-DoF) w.r.t. top left pixel of the digital screen.
2. Obtain the presented layout of the digital display (e.g. 6×4 as presented in FIG. 4).
3. Obtain K images that include human face and two (left/right) eyes fixating on the digital screen, collected via free viewing.
    a. Detection of face and eyes in the image (bounding box for eyes and face)
    b. Filter out images that do not have visible eyes in the frame:
        i. Remove images where eye blink is detected.
        ii. Remove images that do not have minimum pixels (1.5-3-pixels-per-millimeter range is valid),
    c. Generate eye patches within the range of (96×48, 192×96, 384×192), according to the camera resolution and field-of-view.
    d. Output of clean dataset that will be used for unsupervised training (K_DATA__CLEAN).
4. Generate a test-set:
    a. Collection of ground-truth, via target presented on a digital display.
    b. The ground-truth is the (X, Y) location in mm or cm in camera coordinate system.
    c. Create K_DATA_CLEAN samples as described above.
    d. Calculate raw predictions using gaze-prediction-algorithm over K_DATA_CLEAN.
    e. Create the dataset of K_DATA_CLEAN_GT which contains:
        i. Images and patches of face and eyes of the user.
        ii. Ground-truth label (of viewing region and (X, Y) in cm location).
        iii. Raw prediction of any general gaze-prediction-algorithm.
        iv. Digital display grid boundaries (e.g. 6×4 as presented in FIG. 4).

When applied to a multi-user scenario, each user is assigned with an ID, represented by an encoding vector. For each ID, a different boundary adjustment process is applied, resulting in a unique ROI mapping for every user ID without any crosstalk or interference between them.

A pseudocode for the users' inference flow is provided below:

1. For each captured image:
    a. Extract face and eyes bounding boxes (m_face× n_face, m_eye×n_eye).
    b. Obtain digital display grid boundaries
    c. Gaze Estimation Block:
        i. Input: Face, and eyes images
        ii. Raw Gaze Prediction on the digital display (X, Y) cm coordinates.
        iii. Output: (X_raw, Y_raw).
    d. Face Recognition Block:
        i. Input: Face image bounding box.
        ii. Face encoding (128-256 bit vector).
        iii. Output: face_encoding_vector.
    e. For each face_encoding_vector:
        i. Initialize fixation_block.
        ii. Initialize history_prediction_queue (Hist_Pred_Q)
    f. Boundary Adjustments (BA) block:
        i. Initialize boundary to original display grid boundaries (e.g., 3×2, 6×4).
        ii. Output: BA_Grid_Vector
    g. Fixation Block:
        i. Input: Raw Gaze Prediction (X_raw, Y_raw).
        ii. Classification of fixations from the raw gaze prediction vector to Fixation coordinate.
        iii. Output: (X_raw fixation, Y_raw fixation).
    h. Add (X_raw fixation, Y_raw fixation into Hist_Pred_Q
    i. If (Hist_Pred_Q)>Min Hist_Pred_Q_Size (between {10-20} samples)
        i. Input: Hist_Pred_Q
        ii. Cluster all detection in Hist_Pred__Q (e.g. K-means https://en.wikipedia.org/wiki/K-means_clustering, DBSCAN https://en.wikipedia.org/wiki/DBSCAN etc.).
        iii. Output: Hist_Pred_Q_Cluster_Label
    j. For each axis {(X, Y)}:
        i. Calculate cluster center (e.g. Median, weighted average etc.).
        ii. Calculate distance between all pairs of adjacent cluster centers.
        iii. Merge clusters with distance<Min_Cluster_Distance ({0.2-0.5})
        iv. If number of clusters=number of grid bins
            1. Perform boundary adjustment:
                a. Update BA_Grid_Vector to half the Euclidean distance between the two adjacent cluster centers.
            2. Output: BA_Grid_Vecto_updated.

While there is abundant literature about user gaze estimation and its calibration methods, there is little if any research about an end-to-end mapping of the users PoR and ROI onto a digital display without active user calibration or visual stimuli. Most of the known methods use either heuristic methods (by means of regression) to define the mapping from raw-gaze onto a ROI on a digital display, or model-based rules of approximated eye-models via angular corrections. All these methods share a common limitation of coupling the eye-tracking method to the calibration and activity involving the user, either voluntarily through presenting a fixation target, or involuntarily by providing ocular stimuli. To the best of our knowledge we are the first to present a framework that implicitly determines the relationship of raw gaze prediction when it comes to gaze inference of any device or method to the user's ROI and PoR on a digital display using a fully online, and seamless process avoiding any active calibration procedure.

The concept of a data driven online SAP can be extended beyond the 2D digital display to any platform that provides prior knowledge of the visible layout in either in 2D or 3D, in a virtual or physical environment. This technique allows for an end-to-end online training of a scene semantic segments module with, embedded into the framework, domain-expertise knowledge about the eye state (e.g., fixation, saccade [referring to the fast movement of the eye from one fixation object to a target which is located somewhere within the visual field of the eye in order to correct for a position error between eye and target], and smooth pursuit [referring to slow eye movement that stabilizes the projection of the moving target onto the fovea and corrects for any velocity error between eye and target]) and leverages this knowledge which is orthogonal to the PoR mapping. The SAP process is performed implicitly, through unsupervised training process (e.g. the data is not labeled) and the user is not in any way aware of this process, enabling the final objective function, given through the loss function, which can be altered by the system as a function of the task at hand.

Example II

Figure 5:
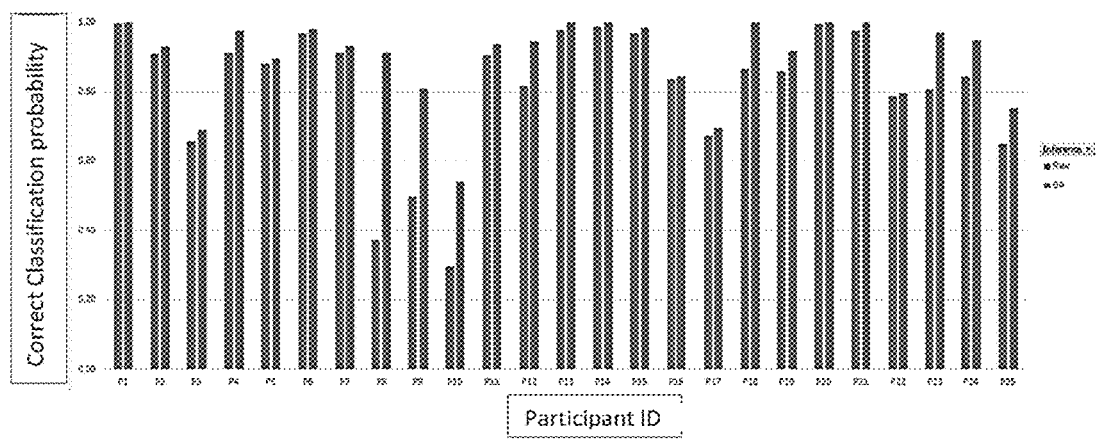
FIG. 5 shows a comparison of raw-gaze prediction (Raw) vs the boundary adjustment (BA) correction.

For the use-case of region classification, a baseline is provided using an appearance-based gaze estimation algorithm (termed here as the Vanilla Algorithm) which is then corrected via the proposed SAP and the effectiveness of the method is then quantified via the table below. The results provided here are based on a test set collected for 320 recording sessions recorded on a MS-Surface-Device (https://en.wikipedia.org/wiki/Microsoft_Surface). The process of data generation is described in FIG. 5. In FIG. 5, raw-gaze prediction (Raw) is compared vs the boundary adjustment (BA) correction. The left-hand bar of each pair of bars is the raw gaze prediction, and the right-hand bar of each pair of bars is the gaze prediction with boundary adjustment. FIG. 5 shows a consistent improvement of the boundary adjustment corrected gaze predication compared to raw gaze prediction.

Figure 1:
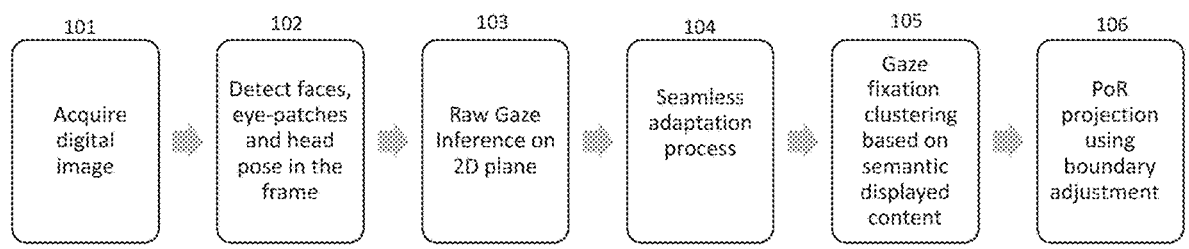
FIG. 1 shows a flow chart of general inference flow for SAP through which gaze estimation is mapped to a 2D PoR on a digital display for content fixation analysis.
Figure 2:
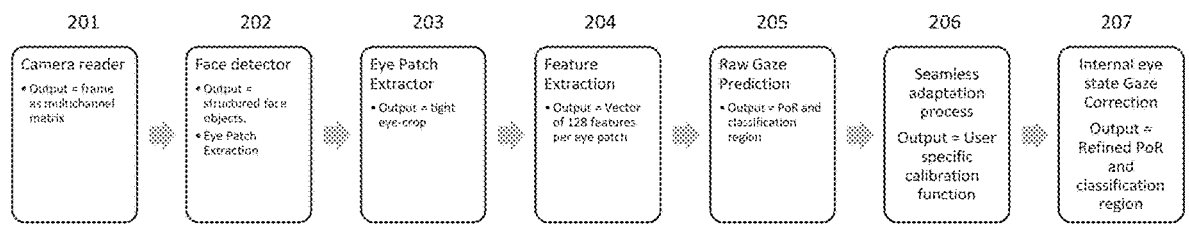
FIG. 2, is a detailed inference flow, describing the flow from digital image acquisition to refined PoR.
Figure 3:
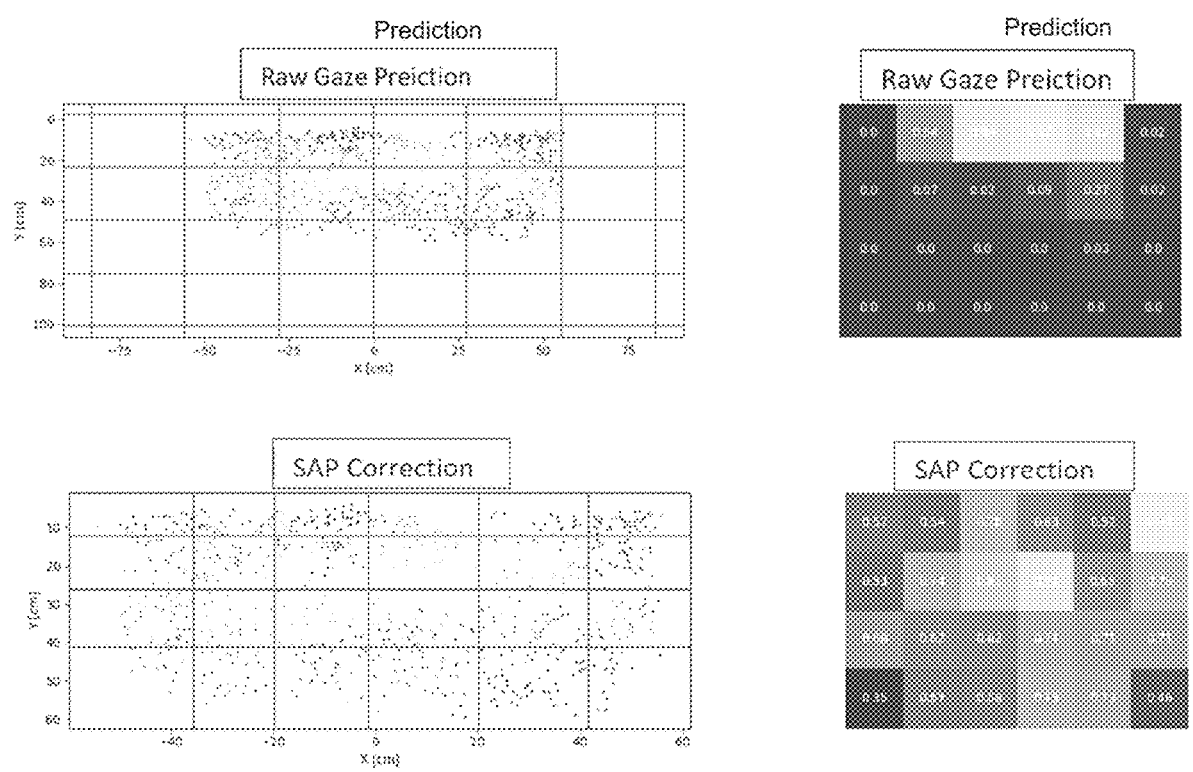
FIG. 3, shows visual results for a seamless-adaptation-process (SAP)

Accordingly and in an exemplary implementation illustrated in FIGS. 1-2, provided herein is a computerized framework of establishing the user's PoR that is implementable in a system comprising a digital-camera facing the user or other means of eye-tracking modules, a central processing module in communication with an operator interface module, a face and eye detection module, rendering module, and a display used for user activation or visual content projection, the method comprising: using the digital-camera, capturing single or multiple images of the user's (or multiple users') eyes: for each image, raw-gaze estimation is extracted (by any means or device available) and PoR mapping is performed using SAP; an imaging database is used to verify and test the system, as indicated in the data acquisition pseudo code disclosed herein. The method comprising: capturing a user fixation labeled image comprising the eye region; each of the (X,Y) coordinates of the user fixation on the display screen are known and used as the ground-truth for the evaluation phase not needed for inference, see evaluation results in FIGS. 3-4.

FIG. 1 shows a schematic of the general system architecture. The operations shown may be performed using the eye-tracking module, with, in certain configurations, an imaging module, the face detection module, and the eye region cropping module (see e.g., FIG. 2), and the layout of FIG. 6, Initially, a labeled dataset is captured, input into an image database to form the dataset used to verify the effectiveness of the PoR mapping to the ROI, however, no labeling is required at the inference stage.

In the method provided, recovering the ROI and PoR of each user in a group of users can comprise: constructing a layout of the digital display (See e.g., 602*i*, FIG. 6); using at least one of the imaging module, the face detection module, or the eye-tracking module, providing raw-gaze prediction (in the eye-tracking coordinate system), classifying the eye-state (e.g., open, closed, fixation, or other). The method further collects a sufficient number of fixation points over the digital layout, applying clustering over the detected fixations and applying a boundary adjustment procedure based on the specific system environment geometry (see e.g., FIG. 6).

Example I: System Architecture

Depending on camera sensor, the output of camera reader 201 (See e.g., FIG. 2):
n×m×1=if Grayscale
n×m×3=if RGB
The output of face detector 202 is a list of structured face objects including at least the following fields:
Crop of the face
Bounding box of the face with respect to frame
Head-pose (6-DoF).
Eye Patch Extractor 203:
Eye landmarks
Bounding boxes for both eyes with respect to frame
Tight eye patch (with small margins around the Sclera region).
Normalization of the eye-patch (rotation of eye patch to rectangular form, intensity values normalization and patch size resize—96×48)
Eye-patch descriptor (EPD) 204:
128 features for each eye based on a CNN.
Raw Gaze Predictor (RGP) 205:
Output is based on Regression (fully connected layers) applied on EPD:
PoR estimation (regression).
Region Selection (classification).
Online Active Learning (OAL) Gaze correction acting on RGP 206:
Accumulation of raw-gaze predictions.
Image based outliers removal (e.g. blink-detection).
Clustering of gaze prediction based on screen regions prior.
Estimation of correction function based on inner-eye-state clustering and screen regions.

If insufficient clusters are obtained, the system will invoke a short stimulus to attract eye fixation (seamless process).

Output of corrected gaze estimator 207 is a PoR and Region selection for each detected face.

It is noted that the term "imaging module" as used herein may refer to a head mounted device unit that includes a plurality of built-in image and/or optic sensors and outputs electrical signals, which have been obtained through photoelectric conversion, as an image, while the term "module" refers to software, hardware, for example, a processor, or a combination thereof that is programmed with instructions for carrying out an algorithm or method. The modules described herein may communicate through a wired connection, for example, a hard-wired connection, a local area network, or the modules may communicate wirelessly. Alternatively, the imaging module may comprise a charge coupled device (CCD), a complimentary metal-oxide semiconductor (CMOS) or a combination comprising one or more of the foregoing. If static images are required, the imaging module can comprise a digital frame camera, where the field of view (FOV) can be predetermined by, for example, the camera size and the distance from the subject's face. The camera used in the imaging modules of the systems and methods disclosed, can be a digital camera. The term "digital camera" refers in an exemplary implementation to a digital still camera, a digital video recorder that can capture a still image of an object, and the like. A digital camera can comprise an image capturing unit or module, a capture controlling module, a processing unit (which can be the same or separate from the central processing module).

Capturing the image can be done with, for example image capturing means such as a CCD solid state image capturing device of the full-frame transfer type, and/or a CMOS-type solid state image capturing device, or their combination. Furthermore, and in another exemplary implementation, the imaging module can have a single optical (e.g., passive) sensor having known distortion and intrinsic properties, obtained for example, through a process of calibration. These distortion and intrinsic properties are, for example, modulation-transfer function (MTF), pinhole camera model attributes such as: principle point location, focal-length for both axes, pixel-size and pixel fill factor (fraction of the optic sensor's pixel area that collects light that can be converted to current), lens distortion coefficients (e.g., pincushion distortion, barrel distortion), sensor distortion (e.g., pixel-to-pixel on the chip), anisotropic modulation transfer functions, space-variant impulse response(s) due to discrete sensor elements and insufficient optical low-pass filtering, horizontal line jitter and scaling factors due to mismatch of sensor-shift- and analog-to-digital-conversion-clock (e.g., digitizer sampling), noise, and their combination. In an exemplary implementation, determining these distortion and intrinsic properties is used to establish an accurate sensor model, which can be used for the calibration algorithm to be implemented.

To facilitate some operations of the methods and programs described, the system can further comprise a graphic processing module (GPM), in communication with the central processing module and the processor. It should be understood though, that the graphics processing module may or may not be a separate integrated circuit.

The system used herein is a computerized system; further comprising a central processing module; a display module; and a user interface module. The Display modules, which can include display elements, which may include any type of element which acts as a display. A typical example is a Liquid Crystal Display (LCD). LCD for example, includes a transparent electrode plate arranged on each side of a liquid crystal. There are, however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

Additionally, "user interface module" broadly refers to any visual, graphical, tactile, audible, sensory, or other means of providing information to and/or receiving information from a user or other entity. For example, a set of instructions which enable presenting a graphical user interface (GUI) on a display module to a user for displaying and changing and or inputting data associated with a data object in data fields. In an exemplary implementation, the user interface module can display any data that it reads from the imaging module.

As indicated, the systems implementing the methods provided, using the programs provided can further comprise a central processing module; a display module; an edge detection module, and a user interface module. The term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As indicated, provided herein is a computer program, comprising program code means for carrying out the steps of the methods described herein, as well as a computer program product (e.g., a micro-controller) comprising program code means stored on a medium that can be read by a computer, such as a hard disk, CD-ROM, DVD, USB memory stick, or a storage medium that can be accessed via a data network, such as the Internet or Intranet, when the computer program product is loaded in the main memory of a computer [or micro-controller] and is carried out by the computer [or micro controller].

Furthermore, provided herein is a computer-readable medium comprising the executable instructions disclosed. Accordingly, provided herein is processor-readable media implementable in the computerized systems described herein, whereby the central processing module further comprising a non-volatile memory having thereon the processor readable media with a set of instructions configured, when executed to cause the central processing module to: user facing digital-camera, capture a plurality of images of the user's face and eye; for each image, a set of raw-gaze predictions is obtained, which is later processed by the SAP with regard to a given digital layout structure (e.g. regular square grid), proving the PoR and ROI mapping, in the form of a probability of fixation on a given region within the digital display, and a given time (with regard to camera timestamp).

The term "computer-readable medium" as used herein, in addition to having its ordinary meaning, refers to any medium that participates in providing instructions to a processor for execution. Such a medium may take many forms, including but not limited to, non-volatile media and volatile media. Non-volatile media can be, for example, optical or magnetic disks, such as a storage device. Volatile media includes dynamic memory, such as main memory.

Memory device as used in the methods, programs and systems described herein can be any of various types of memory devices or storage devices. The term "memory device" is intended to encompass an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory device may comprise other types of memory as well, or combinations thereof in addition, the memory medium may be located in a first computer in which the programs are executed (e.g., a training computer), and/or may be located in a second different computer [or micro controller] which connects to the first computer over a network, such as the Internet and might be even not connected and information will be transferred using USB drive. In the latter instance, the second computer may further provide program instructions to the first computer for execution.

The term "memory device" can also include two or more memory devices which may reside in different locations, e.g., in different computers that are connected over a network.

In the context of the disclosure, the term "operable" means the system and/or the device and/or the program, or a certain element or step is fully functional, sized, adapted and calibrated, comprises elements for, and meets applicable operability requirements to perform a recited function when activated, coupled, implemented, actuated, effected, realized, or when an executable program is executed by the at least one processor associated with the system, the article of manufacture, and/or the device. In relation to systems and circuits, the term "operable" means the system and/or the circuit is fully functional and calibrated, comprises specific logic for, having the hardware and firmware necessary, as well as the circuitry for, and meets applicable operability requirements to perform a recited function when executed by the at least one processor.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stack(s) includes one or more stack). Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Although the foregoing disclosure for systems, methods and programs for seamless screen personalization for regional fixation prediction on a digital display has been described in terms of some exemplary implementations, other exemplary implementations will be apparent to those of ordinary skill in the art from the disclosure herein. Moreover, the described exemplary implementations have been presented by way of example only and are not intended to limit the scope of the exemplary implementations. Indeed, the novel methods, programs, and systems described herein may be embodied in a variety of other forms without departing from the spirit thereof. Accordingly, other combinations, omissions, substitutions, and modifications will be apparent to the skilled artisan in view of the disclosure herein.

While the inventions herein have been described in detail and with reference to specific exemplary implementations thereof, it will be apparent to one of ordinary skill in the art that various changes and modifications can be made therein without departing from the spirit and scope thereof. Accordingly, it is intended that the present disclosure covers the modifications and variations of this invention provided they come within the scope of the appended claims and their equivalents.

What is claimed:

1. A computerized method for determining a user-focused region of interest on a display screen, of the method comprising:
    a) capturing a plurality of images of a user facing the display screen;
    b) determine the user's point of regard (POR) using dimensions of the display screen and a gaze estimation calculation based on the plurality of images; and c) mapping the PoR to a region of interest (ROI) on the display screen; wherein the user is one of a plurality of users facing the display screen, using dimensions of the display screen and a gaze estimation calculation to determine the user's point of regard (POR) comprises:
    a) for each captured image, generating a raw gaze prediction;
    b) selecting screen grid boundaries representing the raw gaze prediction; and
    c) adjusting the screen grid boundaries based on 1) face and eye image data of the user and 2) at least one screen layout.

2. The method of claim 1, wherein the distance between each user facing the display screen and the display screen is between about 30 cm and about 400 cm.

3. The method of claim 1, wherein for each captured image, generating a raw gaze prediction comprises:
    a) detecting a face of the user in each captured mage;
    b) cropping one or more eye-patches from the face of the user in each captured mage;
    c) determining at least one head-pose of the user;
    d) generating a raw gaze inference on the display screen;
    e) classifying the eye state of the user;
    f) collecting a predetermined number of fixation points on the display screen; and
    g) clustering the predetermined number of fixation points.

4. The method of claim 3, wherein generating a raw gaze inference on the display screen comprises:
  a) generating a user-specific calibration function; and
  b) correcting at least one eye-gaze direction to provide at least one refined POR and at least one classification region.

5. The method of claim 1, wherein the system further comprises a scene-semantic segments module.

6. The method of claim 1, wherein the capturing a plurality of images of a user facing the display screen comprises:
  a. capturing the plurality of images of a user facing the display screen with a camera;
  b. identifying face and eye regions within the plurality of images; and
  c. rendering the face and eye regions.

7. The method of claim 1, further comprising verifying and validating the system using at least one image database.

8. The method of claim 1, wherein (X, Y) coordinates of a user fixation on the display screen are known and used as the ground-truth for selecting screen grid boundaries representing the raw gaze prediction.

9. An article of manufacture for determining a focused region of interest (ROD on a display screen for a user among a plurality of users facing the display, comprising a non-transitory computer-readable medium (CRM) including a set of processor-executable instructions that when executed cause at least one processor to:
  a) capture a plurality of images of the user facing the display screen;
  c) determine the user's point of regard (POR) based on dimensions of the display screen and a gaze estimation calculation based on the plurality of images; and
  d) map the PoR to a region of interest (ROI) on the display screen, wherein the instructions for determining the user's point of regard (POR) are configured, when executed, to cause the at least one processor to:
  a) for each captured image, generate a raw gaze prediction;
  b) select screen grid boundaries representing the raw gaze prediction; and
  c) automatically adjust the screen grid boundaries based on 1) face and eye image data of the user and 2) at least one display screen layout.

10. The CRM of claim 9, further comprising instructions that when executed on the at least one processor cause it to:
  a. capture the plurality of mages of a user facing the display screen with a camera;
  b. identify face and eye regions within the plurality of images; and
  c. render the face and eye regions on at least one display screen.

11. The CRM of claim 9, wherein the instructions for generating a raw gaze prediction are further configured, when executed, to cause the at least one processor to:
  a. detect a face of the user in each captured image;
  b. crop one or more eye-patches from the face of the user in each captured image;
  c. determine at least one head-pose of the user;
  d. generate a raw gaze inference on the display screen;
  e. classify the eye state of the user;
  f. collect a predetermined number of fixation points on the display screen; and
  g. cluster the predetermined number of fixation points.

12. The CRM of claim 11, wherein, to generate a raw gaze inference on the display screen, the set of executable instructions are further configured, when executed, to cause the at least one processor to:
  a) generate a user-specific calibration function; and
  b) correct at least one eye-gaze direction to provide at least one refined POR and at least one classification region.

13. The CRM of claim 12, wherein the set of executable instructions are further configured, when executed, to cause the at least one processor ta: classify the eye state as at least one of: fixation, saccade, or smooth pursuit prior to mapping the PoR to a region of interest (ROD on the display screen.

14. The CRM of claim 9, wherein the distance between each user facing the display screen and the display screen is between about 30 cm and about 400 cm.

* * * * *